(12) United States Patent
Sivinski

(10) Patent No.: US 12,501,849 B2
(45) Date of Patent: Dec. 23, 2025

(54) BULK SEED CART WITH LATERALLY ADJUSTABLE CONVEYER ASSEMBLY

(71) Applicant: Jeffrey Alan Sivinski, Cherokee, IA (US)

(72) Inventor: Jeffrey Alan Sivinski, Cherokee, IA (US)

( * ) Notice: Subject to any disclaimer, the term of this patent is extended or adjusted under 35 U.S.C. 154(b) by 498 days.

(21) Appl. No.: 17/644,893

(22) Filed: Dec. 17, 2021

(65) Prior Publication Data

US 2023/0189700 A1    Jun. 22, 2023

(51) Int. Cl.
*B60P 1/36* (2006.01)
*A01C 7/20* (2006.01)
*A01C 15/00* (2006.01)

(52) U.S. Cl.
CPC ............ *A01C 15/006* (2013.01); *A01C 7/208* (2013.01); *B60P 1/36* (2013.01)

(58) Field of Classification Search
CPC ..... A01C 15/006; A01C 15/003; A01C 7/208; B60P 1/36
See application file for complete search history.

(56) References Cited

U.S. PATENT DOCUMENTS

| | | | | |
|---|---|---|---|---|
| 4,183,158 A | * | 1/1980 | Satterwhite | E02F 3/18 198/581 |
| 5,538,388 A | * | 7/1996 | Bergkamp | B60P 1/42 D15/27 |
| 5,718,556 A | * | 2/1998 | Forsyth | B60P 1/36 414/528 |
| 5,785,481 A | * | 7/1998 | Ockels | B60P 1/42 222/1 |
| 7,500,817 B2 | * | 3/2009 | Furrer | A01C 15/003 198/312 |
| 8,622,192 B2 | * | 1/2014 | Borkgren | A01C 15/003 198/312 |
| 9,566,891 B2 | | 2/2017 | Neufeld et al. | |
| 9,834,126 B2 | | 12/2017 | Neufeld et al. | |
| 9,844,185 B2 | * | 12/2017 | Renyer | A01D 90/00 |
| 10,426,092 B2 | * | 10/2019 | Van Mill | B60P 1/42 |
| 2013/0149090 A1 | * | 6/2013 | Friggstad | B60P 1/42 414/523 |
| 2015/0132093 A1 | * | 5/2015 | Biggerstaff | A01D 41/1217 414/523 |

* cited by examiner

Primary Examiner — Mark C Hageman
(74) Attorney, Agent, or Firm — McKee, Voorhees & Sease, PLC

(57) ABSTRACT

A bulk seed cart has a dual conveyor system adjustable about three axes to provide easy alignment of the conveyor discharge chute over a planter seed tank fill opening. The conveyor assembly is adjustable about a vertical axis between field and transport positions, about a first horizontal axis for laterally extending and retracting the discharge chute, and about a second horizontal axis for raising and lowering the discharge chute. The inner and outer conveyors of the conveyor assembly are linked to move in unison in a lateral direction about a first horizontal pivot axis. The outer conveyer is pivotal about the second horizontal axis and the vertical axis.

15 Claims, 22 Drawing Sheets

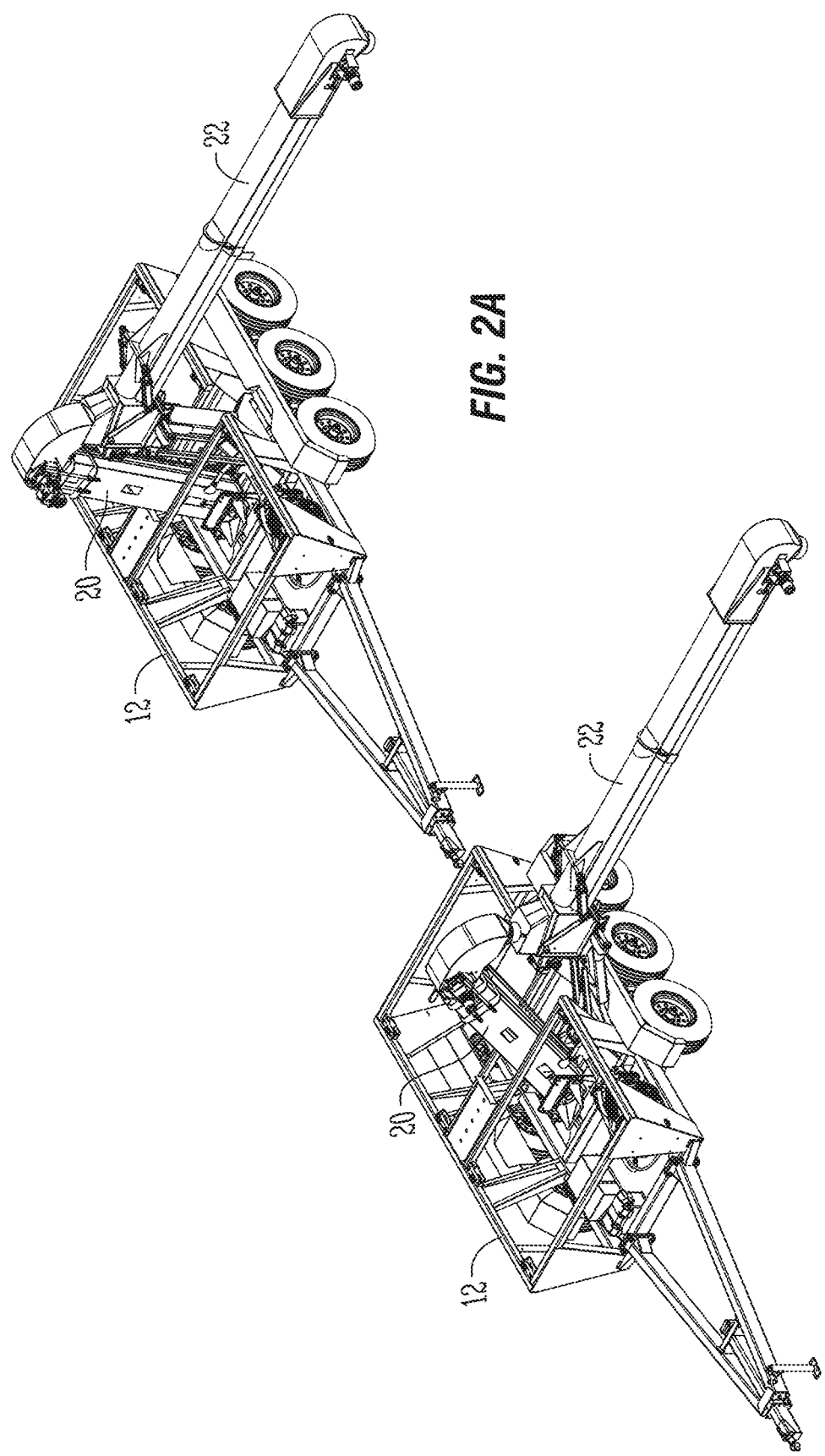

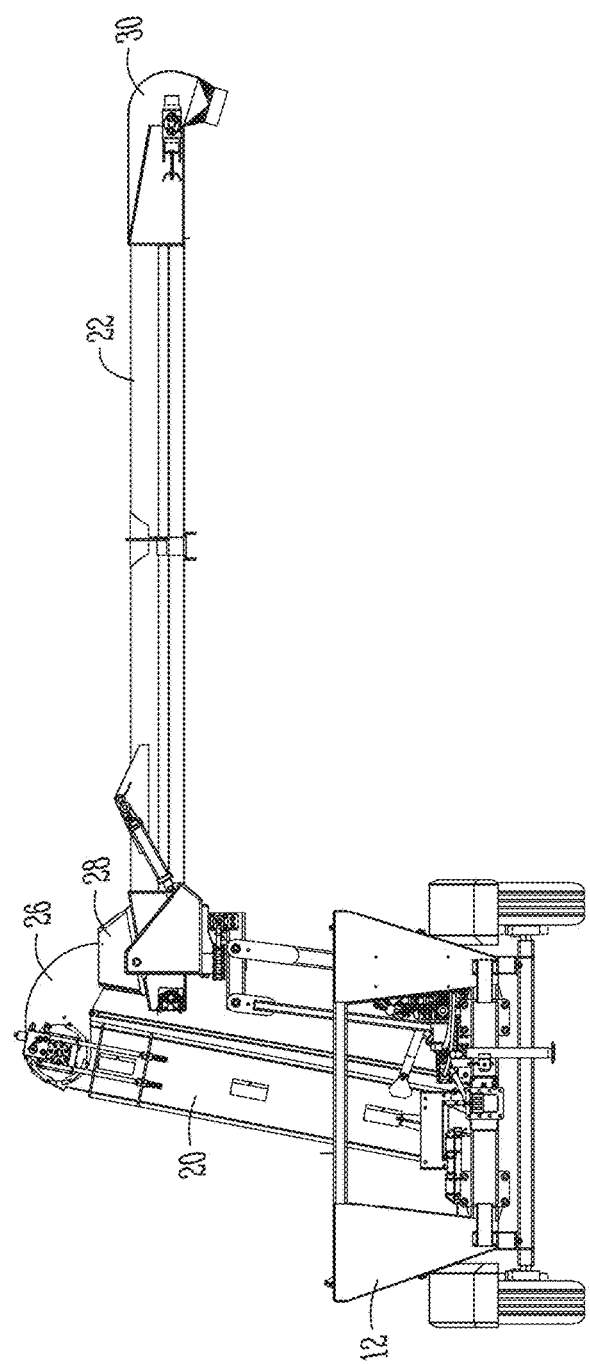
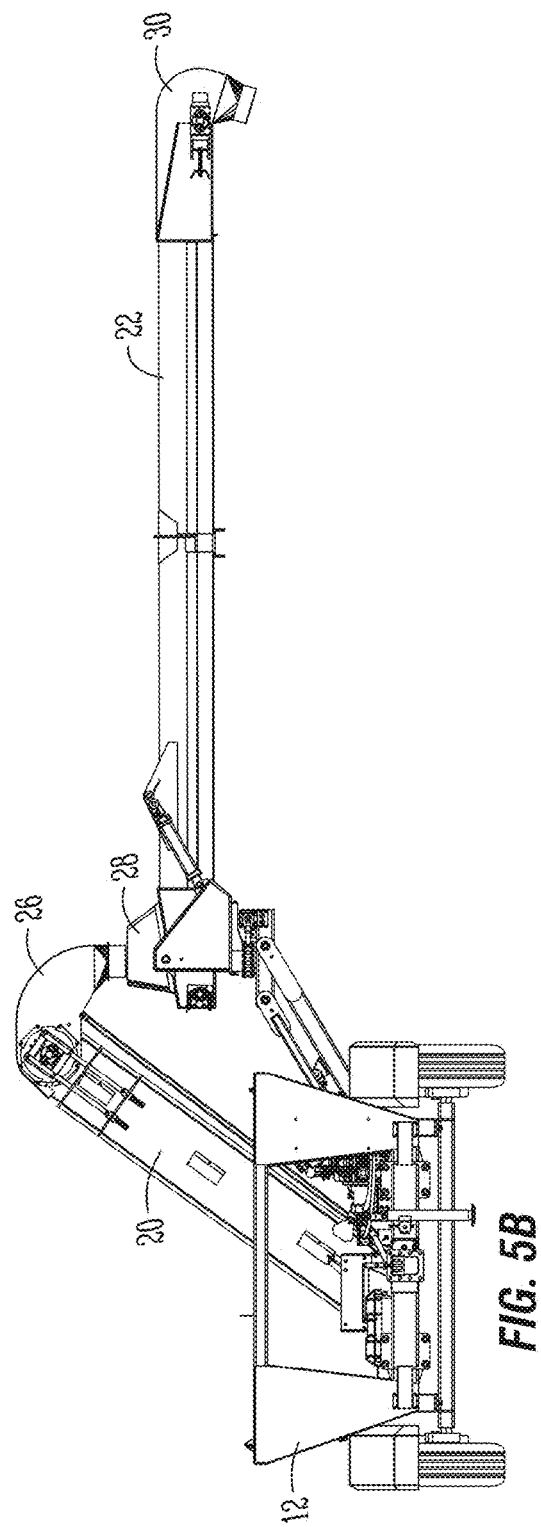
FIG. 5A
FIG. 5B

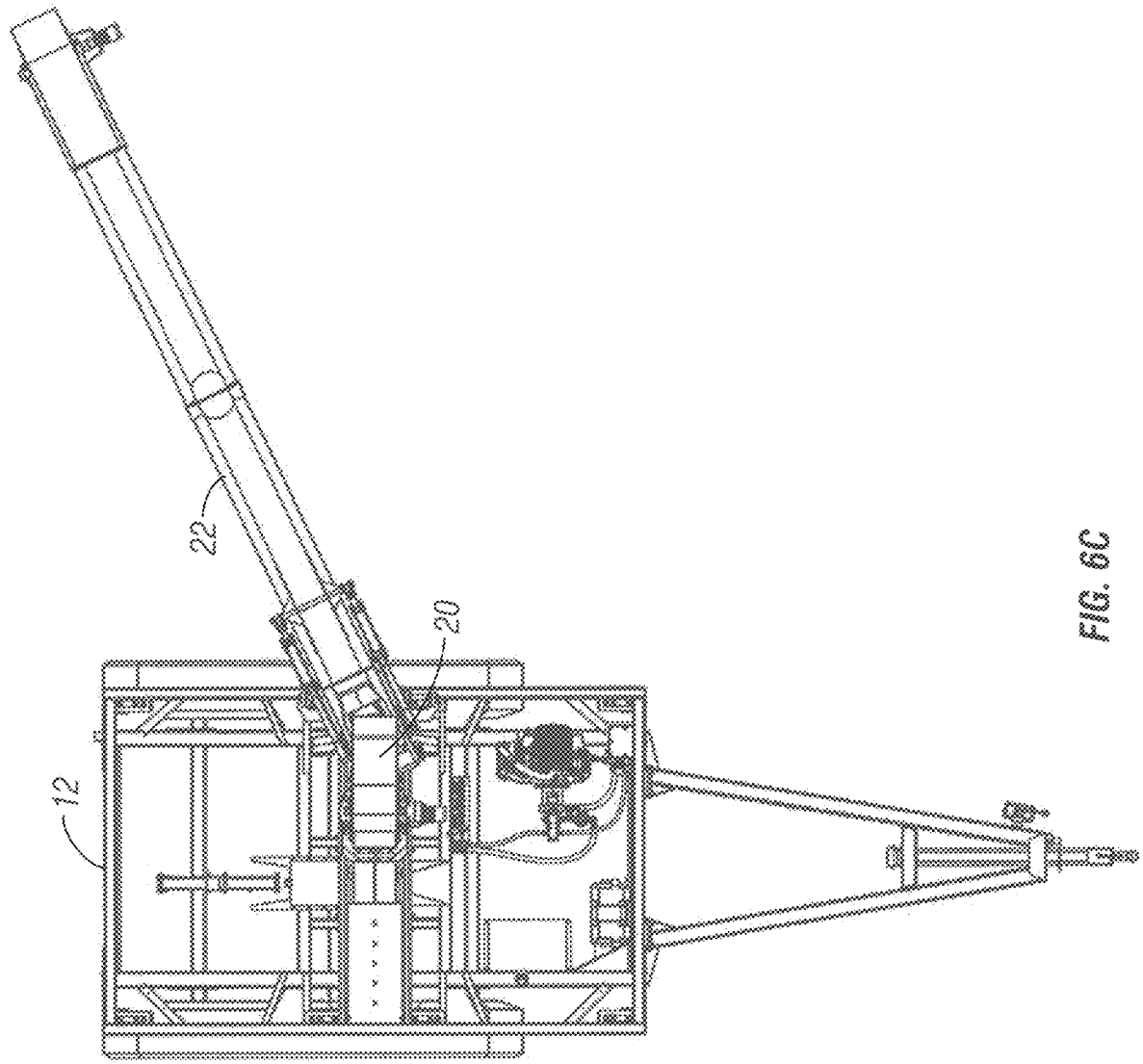

BULK SEED CART WITH LATERALLY ADJUSTABLE CONVEYER ASSEMBLY

FIELD OF THE INVENTION

The invention relates to bulk seed carts, and an improvement in the conveyer assembly which allows for lateral adjustment so that the discharge chute can be readily positioned over the inlet opening of a seed tank on a planter.

BACKGROUND OF THE INVENTION

Agricultural farming operations typically use a row planter with a plurality of seed tanks for planting crops. The seed tanks are periodically filled from a bulk seed cart positioned adjacent the planter so that the outlet or discharge chute on the terminal end of the conveyer of the cart is positioned over the seed tank fill opening, thereby dispensing seed from the cart to the tank. The conveyor typically can be pivoted about a vertical axis from a transport position residing adjacent the bulk seed cart and a field position extending outwardly from the seed cart. The conventional conveyor also is pivotal about a horizontal axis at the lower end of the conveyer so as to raise and lower the discharge chute on the upper end of the conveyer. Thus, the conveying systems on current bulk seed carts are pivotal about two axes, one vertical for left and right movement of the conveyer and the other horizontal for up and down movement of the conveyer. Accurately positioning or aligning the discharge chute of the conveyer over the tank inlet opening is difficult, and often requires repositioning of the planter or the seed cart. Flexible spouts or hoses have been added to the discharge chute of the conveyer to help overcome the alignment problem, but still require the cart to be a precise distance from the planter, which can be difficult when visibility is poor, such as in dusty conditions or in the dark, when some farmers continue planting after the sun sets. The spout or hose also requires the outlet of the conveyer to be raised higher for clearance of the spout or hose above the seed tank. Adding elevation to the conveying system may cause damage to the fragile seeds, due to a greater falling distance. Damaged seeds will not germinate and grow.

Accordingly, a primary objective of the present invention is the provision of an improved conveying assembly for a bulk seed cart which is adjustable about three axes for simplified positioning of the discharge chute over a planter seed tank opening.

Another objective of the present invention is the provision of a conveying assembly for a bulk seed cart which is pivotal about a vertical axis and two horizontal axes.

A further objective of the present invention is the provision of a bulk seed cart having a conveyor assembly which can be laterally adjusted relative to one side of the cart.

Still another objective of the present invention is the provision of a bulk seed cart having a dual conveyer assembly which allows for quick and easy positioning of the conveyer discharge chute, while minimizing the distance that seeds drop from the chute into a row planter seed tank.

Another objective of the present invention is the provision of a method of adjusting the outlet of a bulk seed cart conveyer assembly for accurate positioning and alignment with a planter seed tank fill opening.

Yet another objective of the present invention is the provision of a method of adjusting the position of a conveyer on a bulk seed cart relative to a row planter seed tank, without repositioning the cart or the row planter.

These and other objectives become apparent from the following description of the invention.

SUMMARY OF THE INVENTION

The bulk seed cart of the present invention includes a seed storage hopper with a lower outlet. A conveyer system or assembly receives seed from the hopper outlet and carries the seed upwardly to a discharge chute for dispensing into a seed tank on a row planter. The conveyer system includes a first inner conveyer and a second outer conveyer. The inner conveyer is pivotal about a longitudinally extending horizontal axis. The second outer conveyer is pivotal about a second longitudinally extending horizontal axis and about a vertical axis. Thus, the discharge chute on the outer end of the outer conveyer can be pivot left and right about the vertical axis, and up and down about the second horizontal axis. The inner conveyer, with the connected second conveyer, can be pivoted about the first horizontal axis to adjust the lateral position of the discharge chute. The method of filling a planter seed tank involves the steps of moving a bulk seed cart and the planter seed tank adjacent to one another. Then, the position of the discharge chute of the conveyer on the seed cart can be adjusted up and down, forwardly and rearwardly, and inwardly and outwardly to quickly and easily align the discharge chute with the opening on the top of the planter seed tank. The conveyer assembly is then actuated to carry seed from the bulk seed cart to the seed tank.

BRIEF DESCRIPTION OF THE DRAWINGS

FIG. 2A is a view similar to FIG. 1A, with the bulk seed hopper removed from the cart to show the lower end of the first conveyer.

FIG. 2B is a view similar to FIG. 1B, with the hopper removed to show the lower end of the first conveyer.

FIG. 5A is a front elevation view of the bulk seed cart shown FIG. 1A, with the hopper removed.

FIG. 5B is a front elevation view of the bulk seed cart shown in FIG. 1B, with the hopper removed.

FIG. 6C is another top plan view showing the outer conveyer in another field position.

DETAILED DESCRIPTION OF THE PREFERRED EMBODIMENTS

Figure 1A:
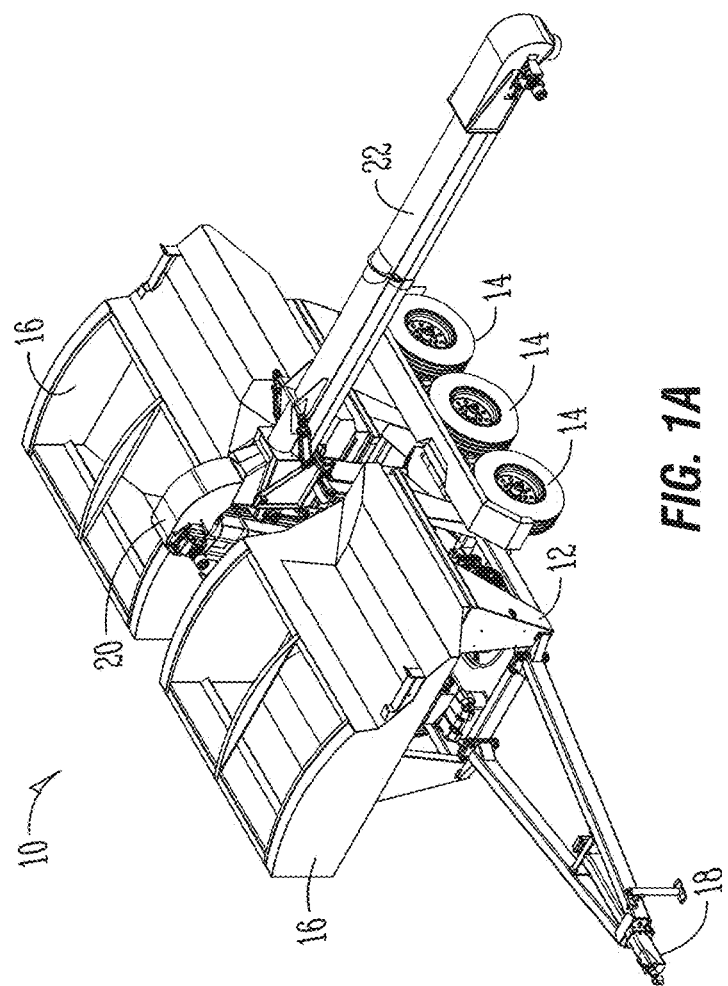
FIG. 1A is a perspective view of the bulk seed cart of the present invention with the conveyer assembly in a laterally retracted field position.

A bulk seed cart 10 generally includes a frame 12 supported on wheels 14 and front and rear hoppers 16. The cart 10 includes a hitch receiver 18 for hitching the cart to a tractor or other vehicle for towing the cart.

The bulk seed cart 10 also includes a dual conveyor assembly or system with a first inner conveyor 20 and a second outer conveyor 22. The inner conveyor 20 includes a lower end with an inlet 24 and an upper end with an outlet or discharge chute 26. The other conveyor 22 has an inner end 28 positioned beneath the outlet 26 of the inner conveyor 20, and an outer end 30 terminating in a discharge chute 32.

Figure 6A:
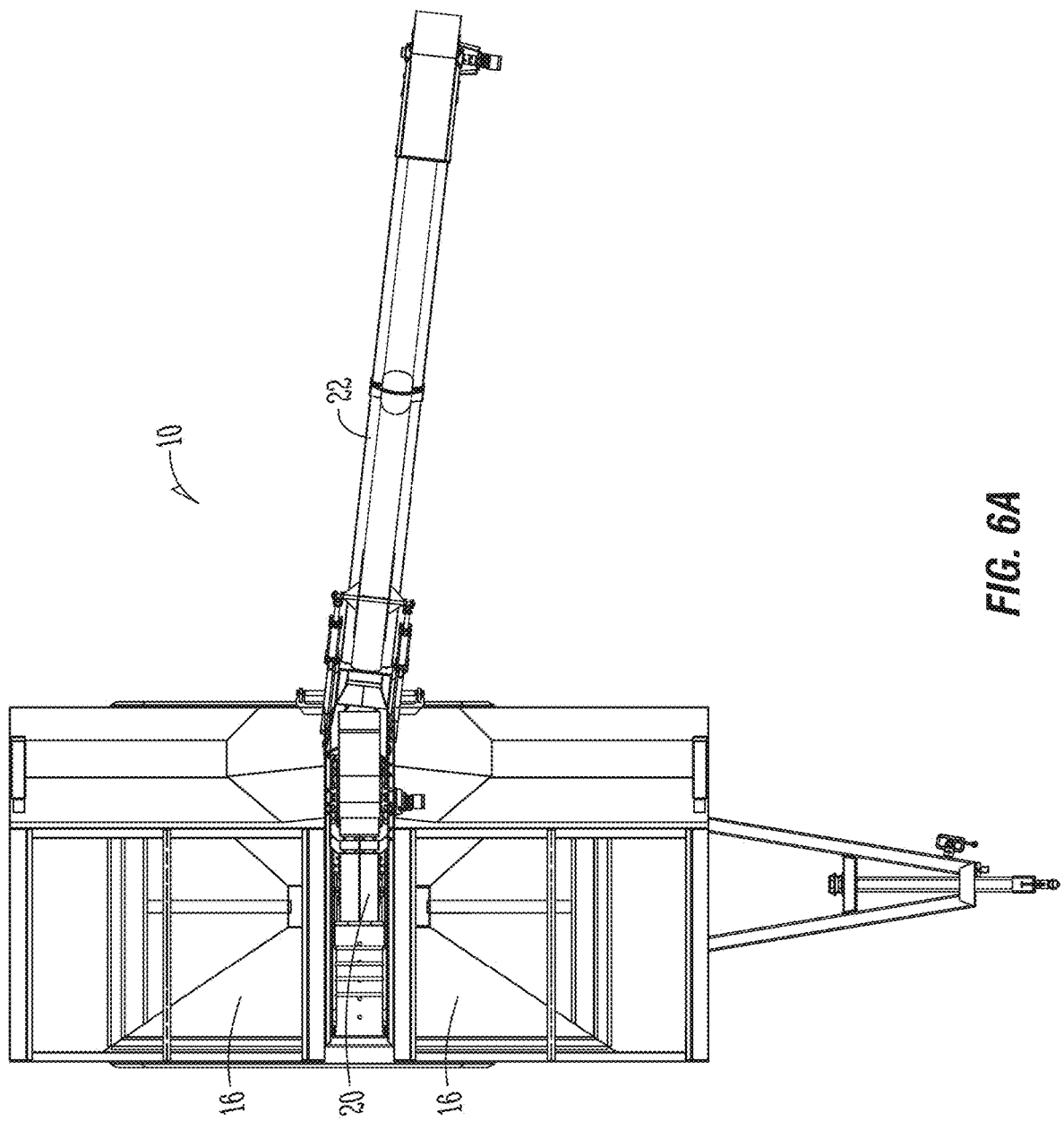
FIG. 6A is a top plan view of the bulk seed cart with the second conveyer partially pivoted about a vertical axis and with the first inner and second outer conveyors in a retracted lateral position.
Figure 6B:
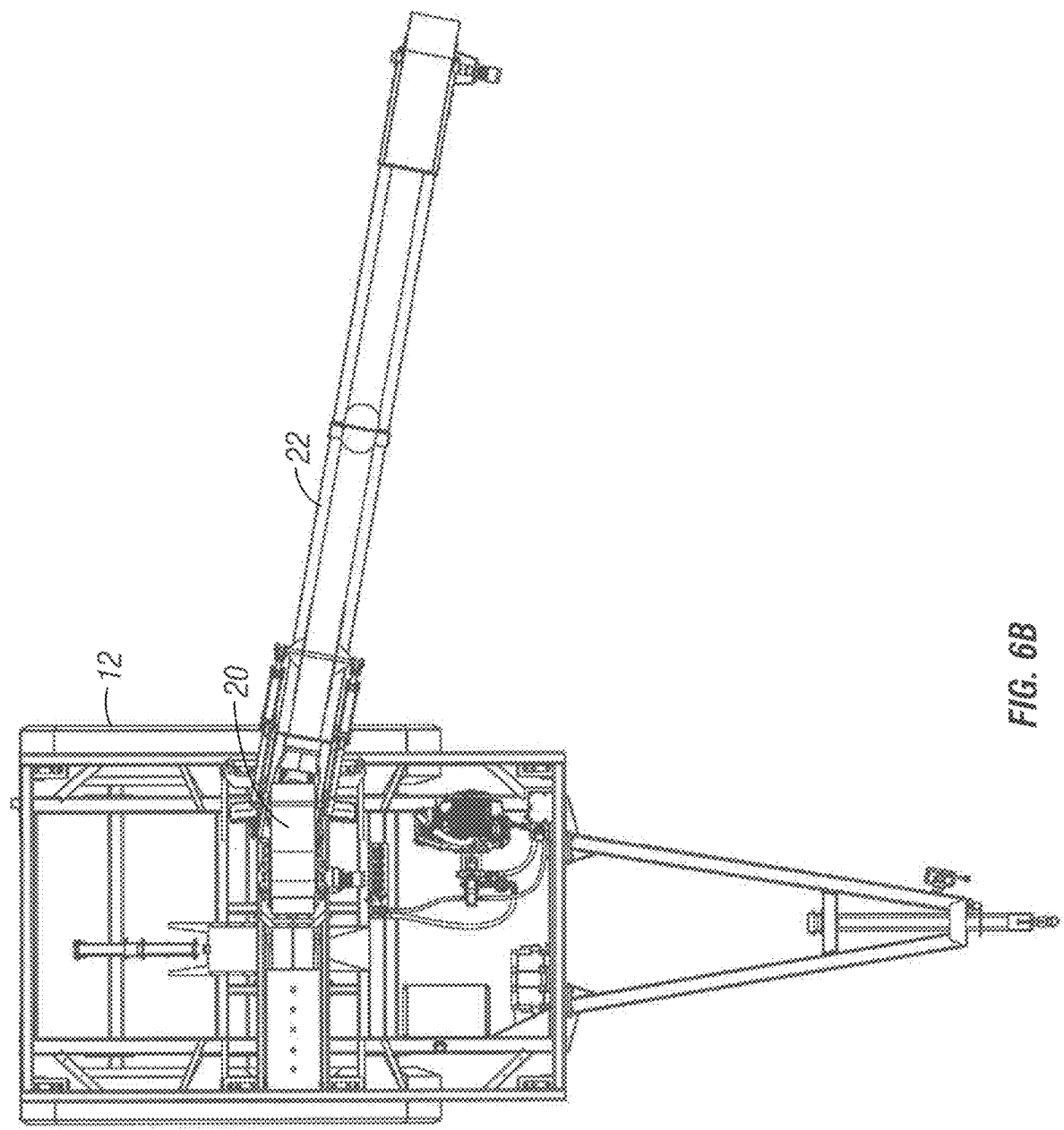
FIG. 6B is a view similar to FIG. 6A, but with the first and second conveyors in an extended lateral position with the hopper removed for clarity.
Figure 6D:
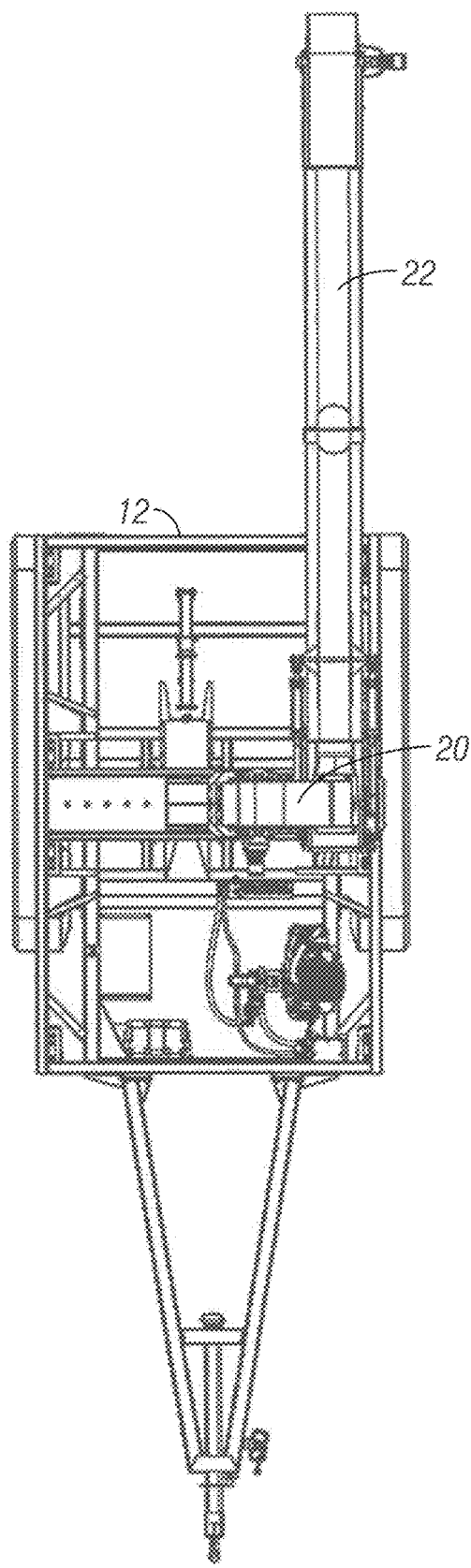
FIG. 6D is a top plan view showing the outer conveyer in a rear discharge position.
Figure 7:
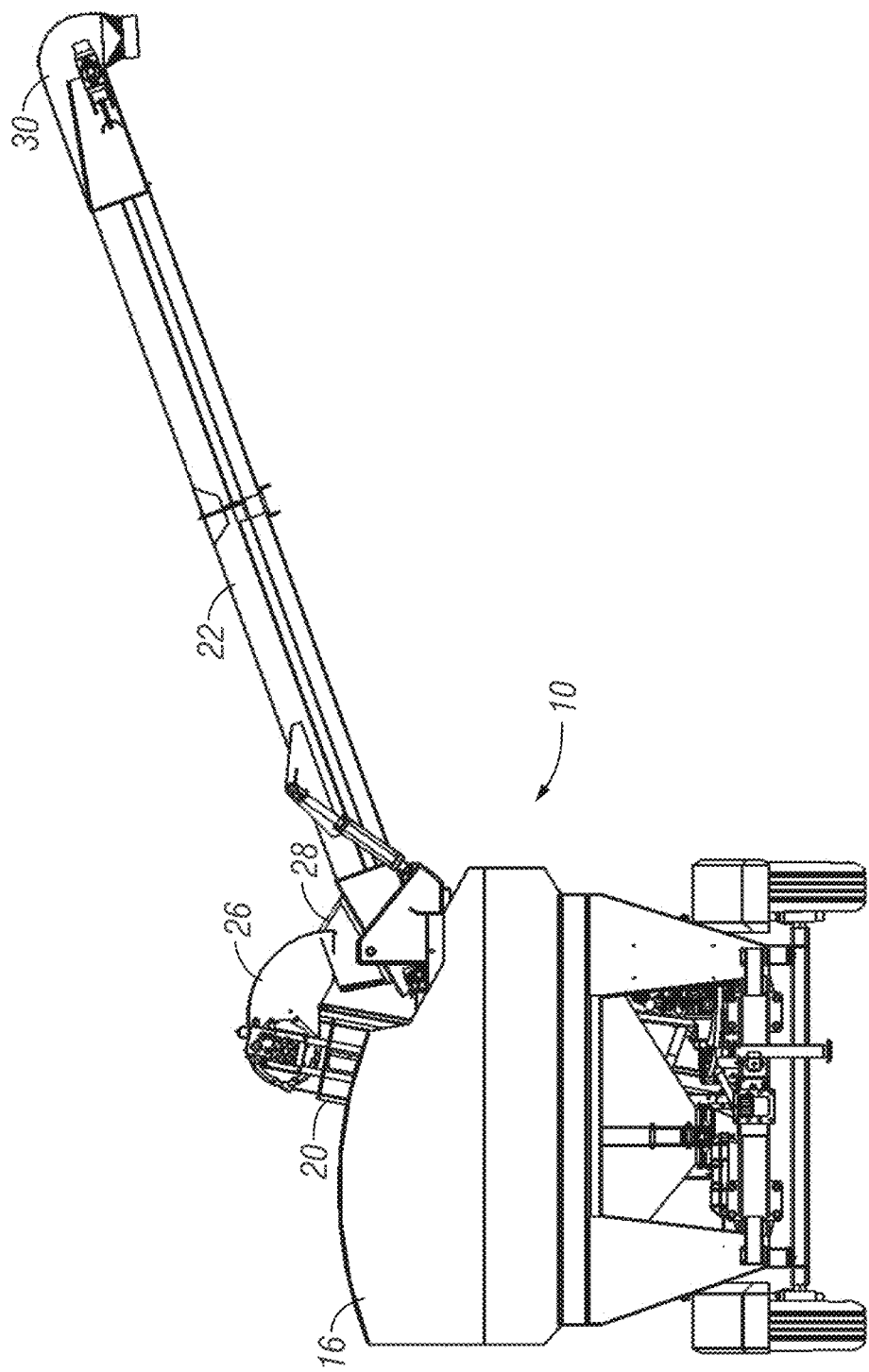
FIG. 7 is a front elevation view of the seed cart shown FIG. 1A, with the outer conveyer pivoted to a raised position.
Figure 8:
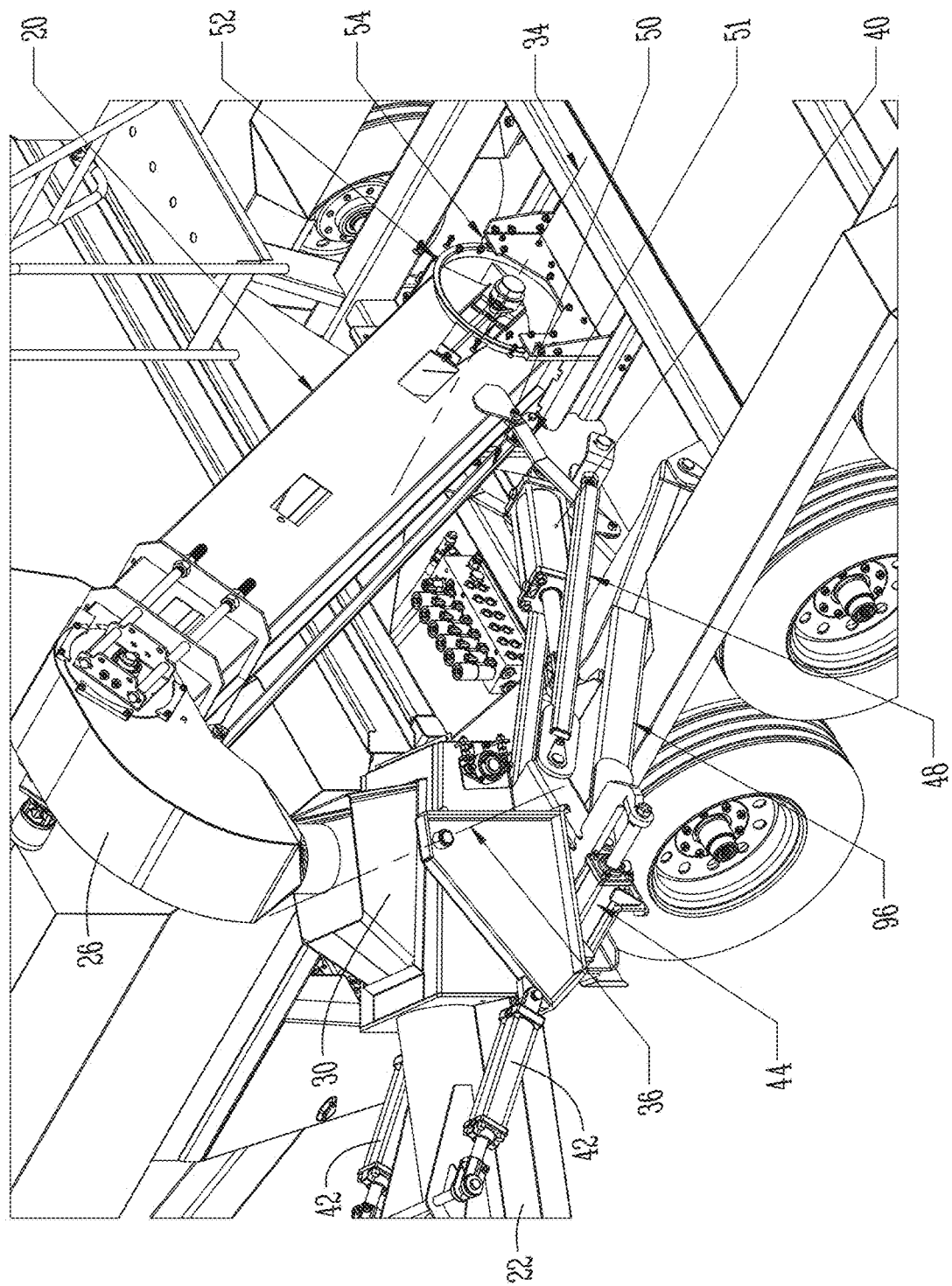
FIG. 8 is a partial perspective view of the bulk seed cart with the rear hopper removed.
Figure 9A:
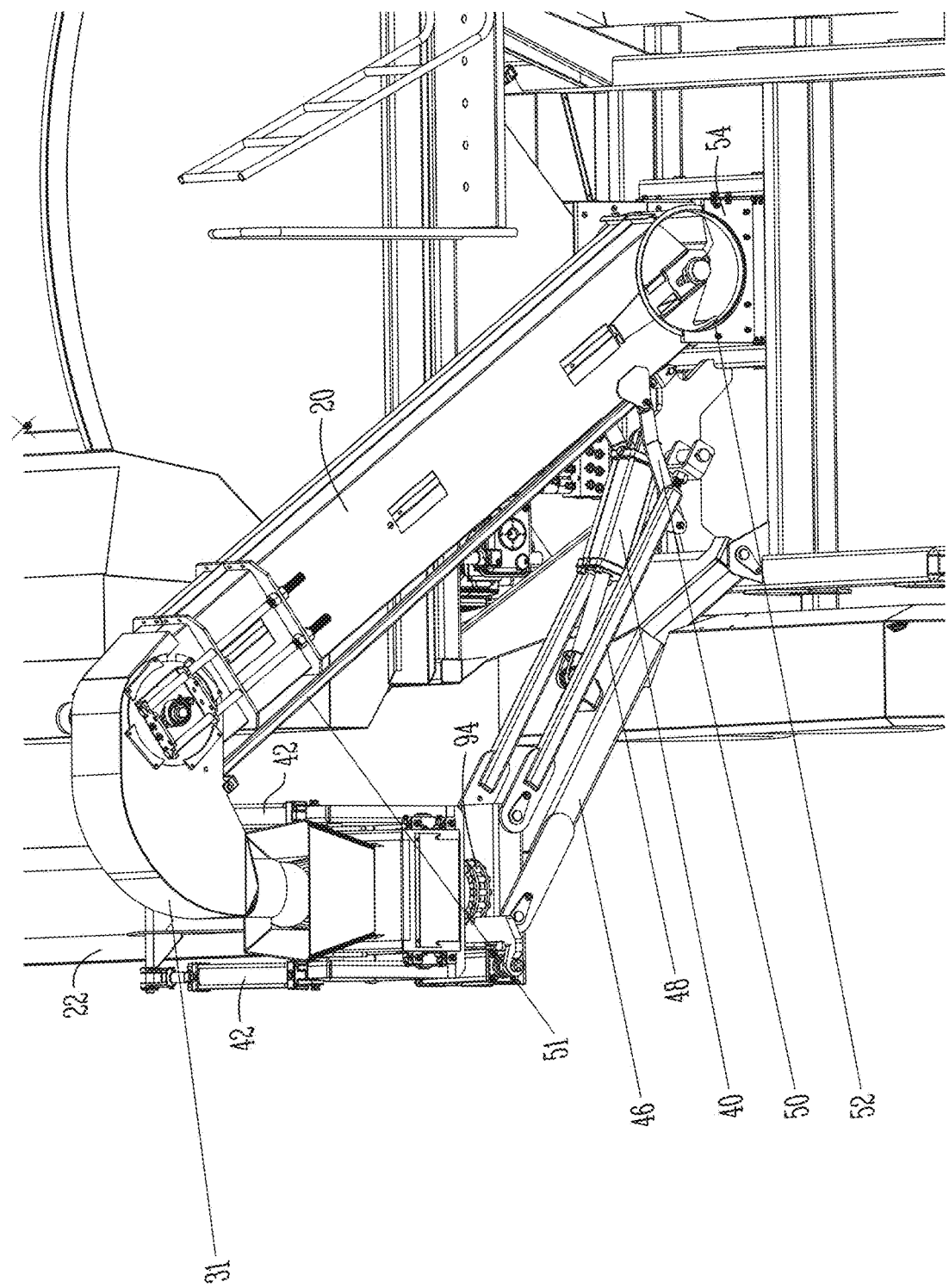
FIG. 9A is another partial perspective view of the cart with the rear hopper removed and the outer conveyer in a transport position.
Figure 9B:
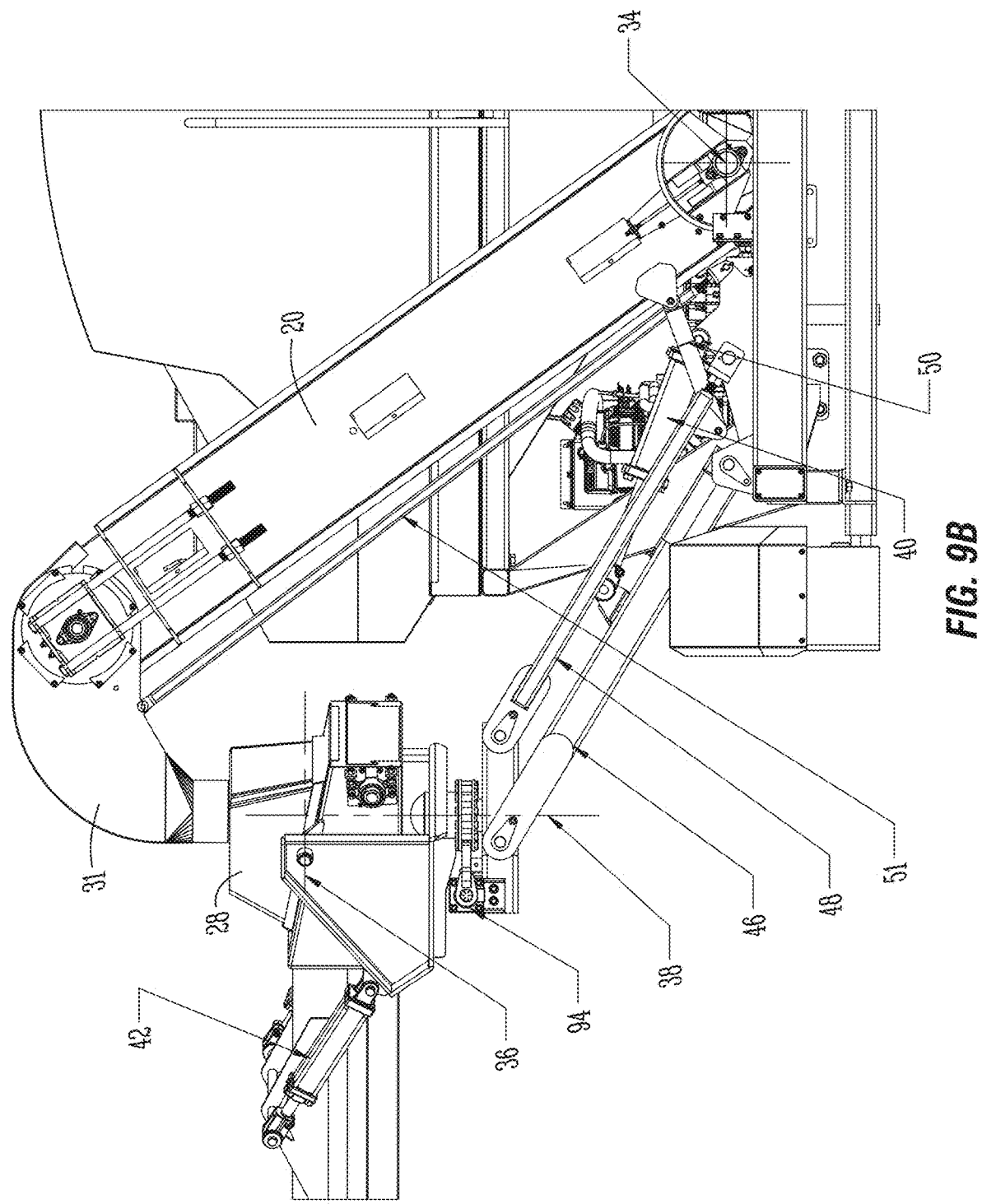
FIG. 9B is a partial side elevation view, with the outer conveyer in a field position.

The first inner conveyor 20 extends upwardly between the hoppers 16 and is pivotal about a longitudinally extending, first horizontal axis 34 (FIGS. 8 and 9B). The inner conveyor 20 is pivotal about the axis 34 so that the outlet 26 is laterally adjustable inwardly and outwardly. The second outer conveyer 22 is pivotal about a second horizontal axis 36, such that the outer end 30 can be raised and lowered. The outer conveyer 22 is also pivotal about a vertical axis 38 (FIG. 9B) such that the outer conveyor 22 is pivotal between a field position extending longitudinally adjacent to the hoppers 16, as shown in FIGS. 14A-F, and a field position extending outwardly from the hoppers 16, as shown in FIGS. 1A and 1B, 3A and 3B, 6A-D, and 7.

The pivotal movement of the conveyors 20, 22 is controlled by actuators, such as hydraulic cylinders. For example, a first hydraulic cylinder 40 controls the lateral position of the inner and outer conveyors 20, 22. A second hydraulic cylinder or pair of hydraulic cylinders 42 control the pivotal movement of the second cylinder 22 about the second horizontal axis 36 for raising and lowering the outer end 30 of the outer conveyer 22. A third hydraulic cylinder 44 controls the pivotal movement of the outer conveyer 22 about the vertical axis 38.

A plurality of linkages are provided to facilitate the movement of the conveyors 20, 22. For example, parallel link support arms have a lower end connected to the frame 12 and upper ends pivotally connected to the inner end or base 28 of the outer conveyer 22. Parallel link support arms 48 have lower ends pivotally connected to the frame 12 and upper ends pivotally connected to the inner end base 28 of the outer conveyer 22. A pair of parallel link arms 50 connect the inner link arms 48 to the inner conveyor 20. Thus, upon actuation of the first cylinder 40, the outer link arms 46, inner link arms 48, and link arms 50 cooperate to extend the inner and outer conveyors 20, 22 laterally outwardly when the cylinder 40 is extended, and laterally inwardly when the cylinder 40 is retracted. This simultaneous movement of the conveyors 20, 22 maintains the discharge end 26 of the inner conveyor 20 aligned with the inlet end 28 of the outer conveyer 22.

Figure 10:
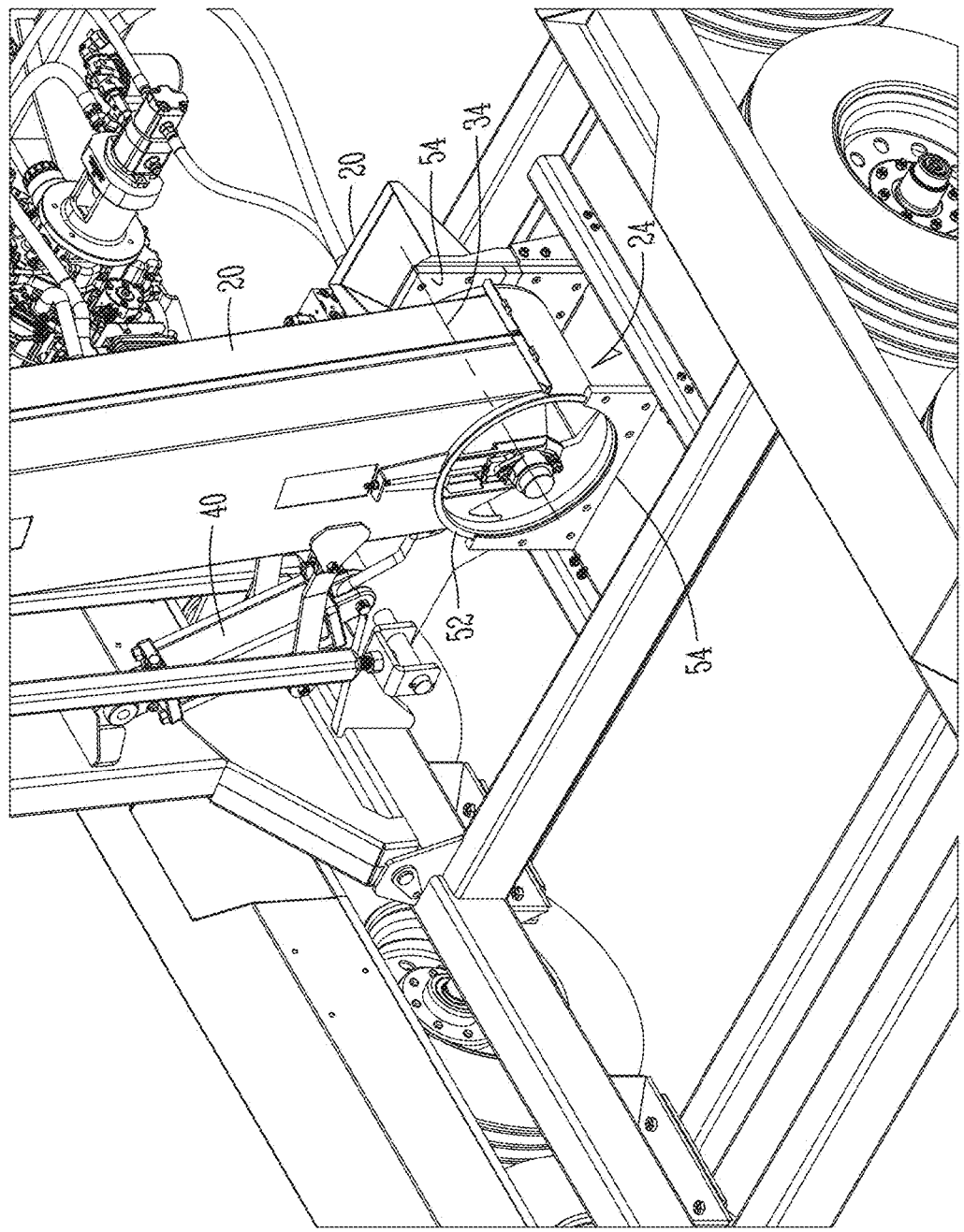
FIG. 10 is a partial perspective view of the lower end of the first inner conveyer, with the cart hoppers removed.

As seen in FIGS. 8-10, the inner conveyor 20 has front and rear ring flanges 52 on opposite sides of the lower end 24. The ring flanges are rotatably supported in plastic guide blocks 54, which completely encircle the ring flanges 52. It is noted that in the drawings, the upper half of the rear block 54 is removed for clarity. The blocks 54 have grooves to receive the flanges 52 to facilitate rotation of the inner conveyor 20 about the first horizontal axis 34 upon actuation of the cylinder 40.

Figure 11:
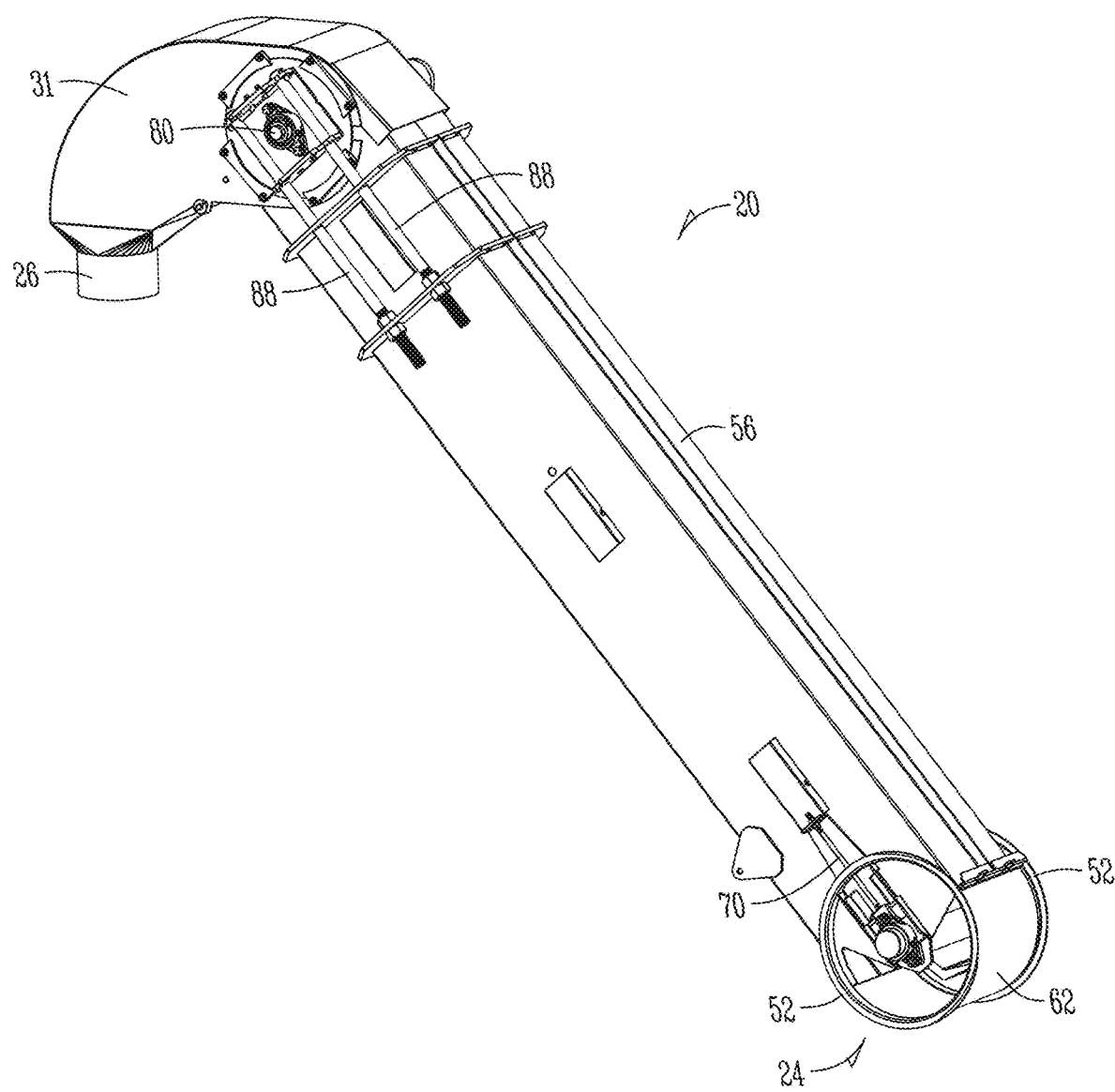
FIG. 11 is a perspective view of the inner conveyer.
Figure 12:
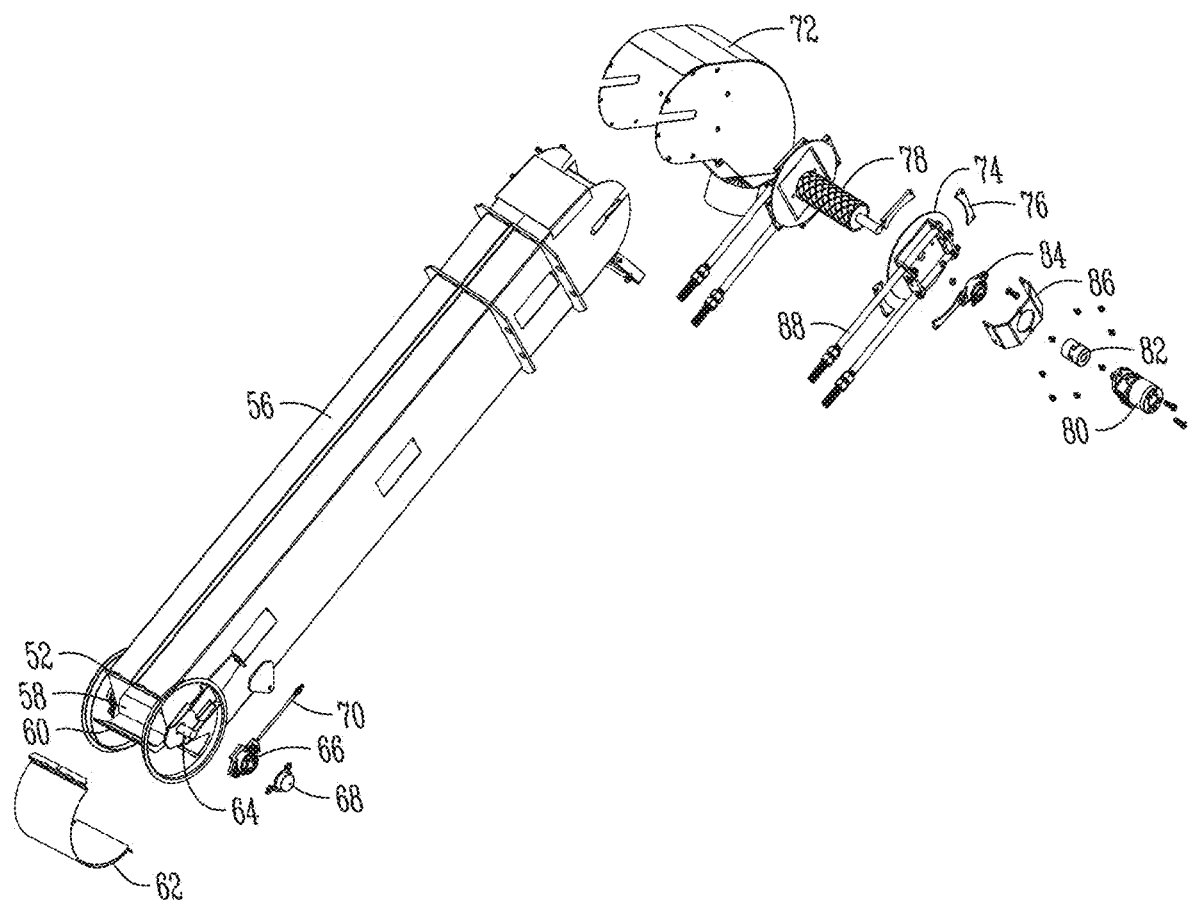
FIG. 12 is an exploded view of the inner conveyer.

The basic structure of the inner conveyor 20 is shown in FIGS. 11 and 12. The lower end of the conveyor 20 includes a frame 56, a conveyor belt 58 with scoops 60, a cleanout door 62, a belt take up roller 64, a bearing 66, a bearing cover 68, and an adjustment rod 70 to adjust the tension on the belt 58. The upper end of the conveyor 20 includes a discharge hood 72, a drive roller 74 a pair of hood pivot plates 74 on opposite sides of the drive roller 76, hood guide blocks 76, a drive motor (preferably hydraulic) 80, a bearing 82, a shaft coupler 84 to connect the shaft of the drive roller 78 to the motor 80, and a support plate 86 for the motor 80. Belt tension bolts 88 are provided on opposite sides of the upper conveyor housing or frame 90 to adjust the tension in the belt 58.

The inner conveyor 20 utilizes a flexible connection for the hood 72 that allows the discharge opening to remain relatively horizontal, whether the conveyor 20 is laterally extended or retracted, as seen in FIGS. 5A and 5B. This flexibility assures that the seed is directed from the first conveyor 20 to the second conveyor 22, without seed spillage.

Figure 13:
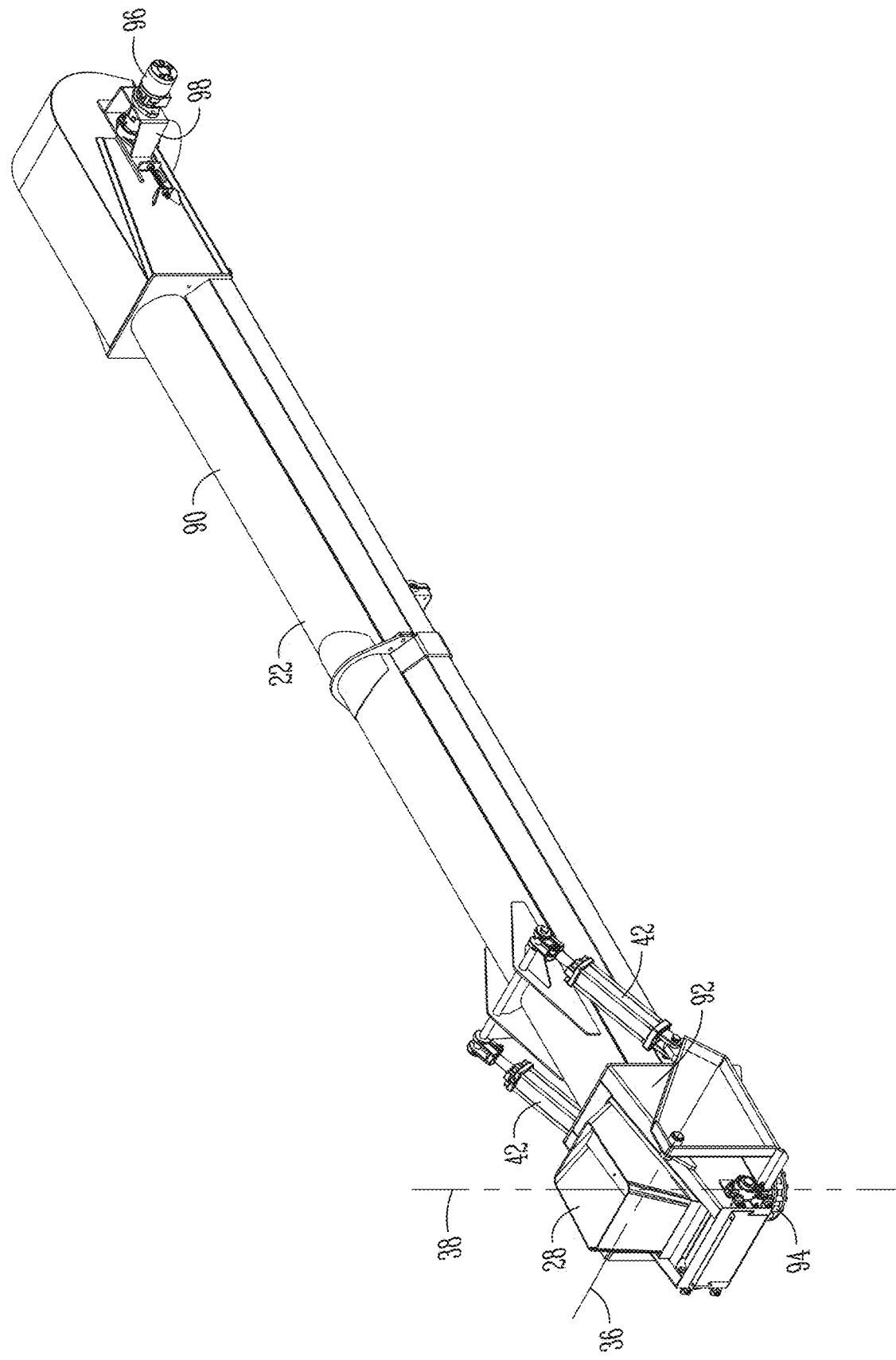
FIG. 13 is a perspective view of the outer conveyer.
Figure 14A:
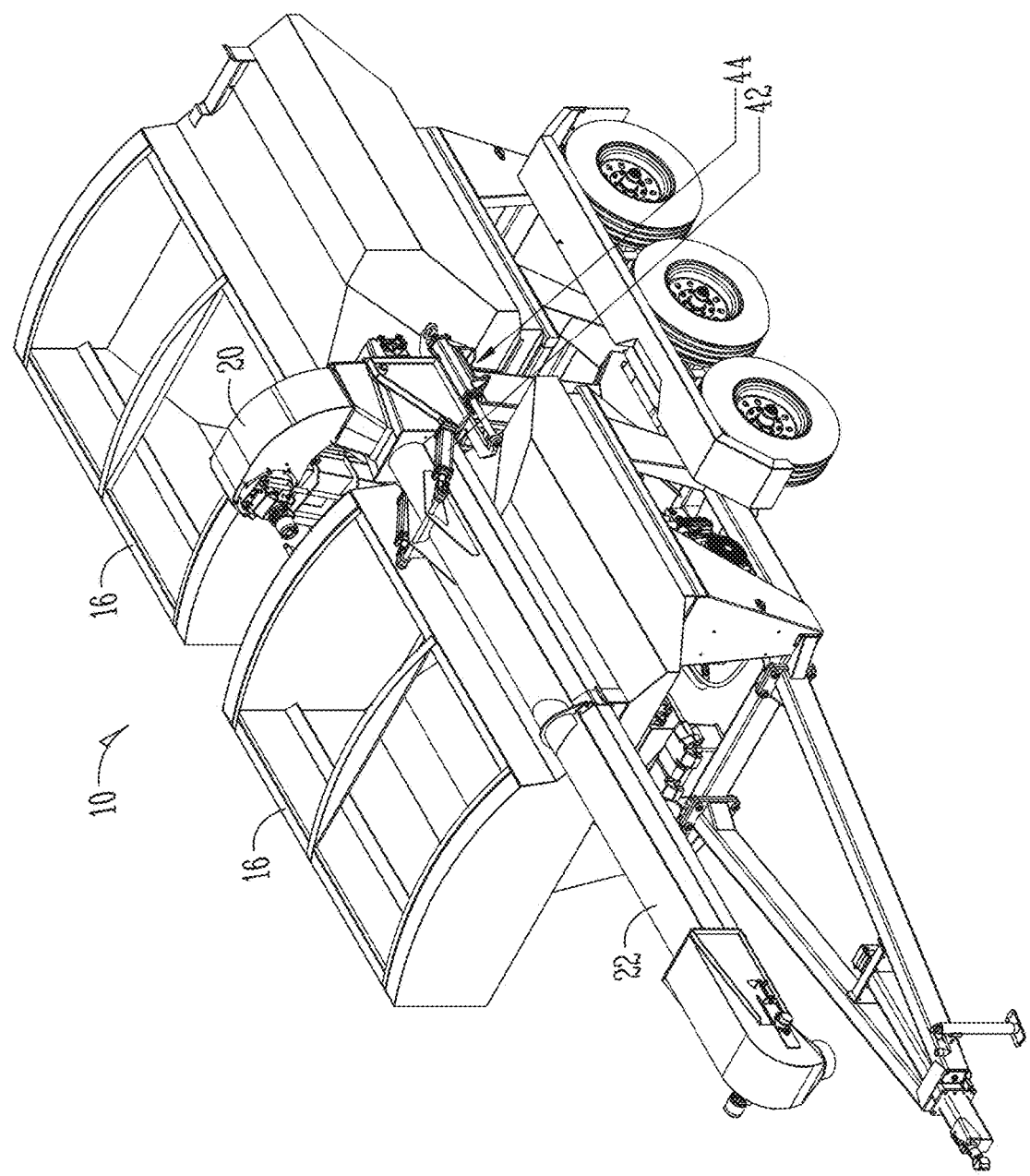
FIG. 14A is a front perspective view of the bulk seed cart with the conveyor assembly in a transport position.
Figure 14B:
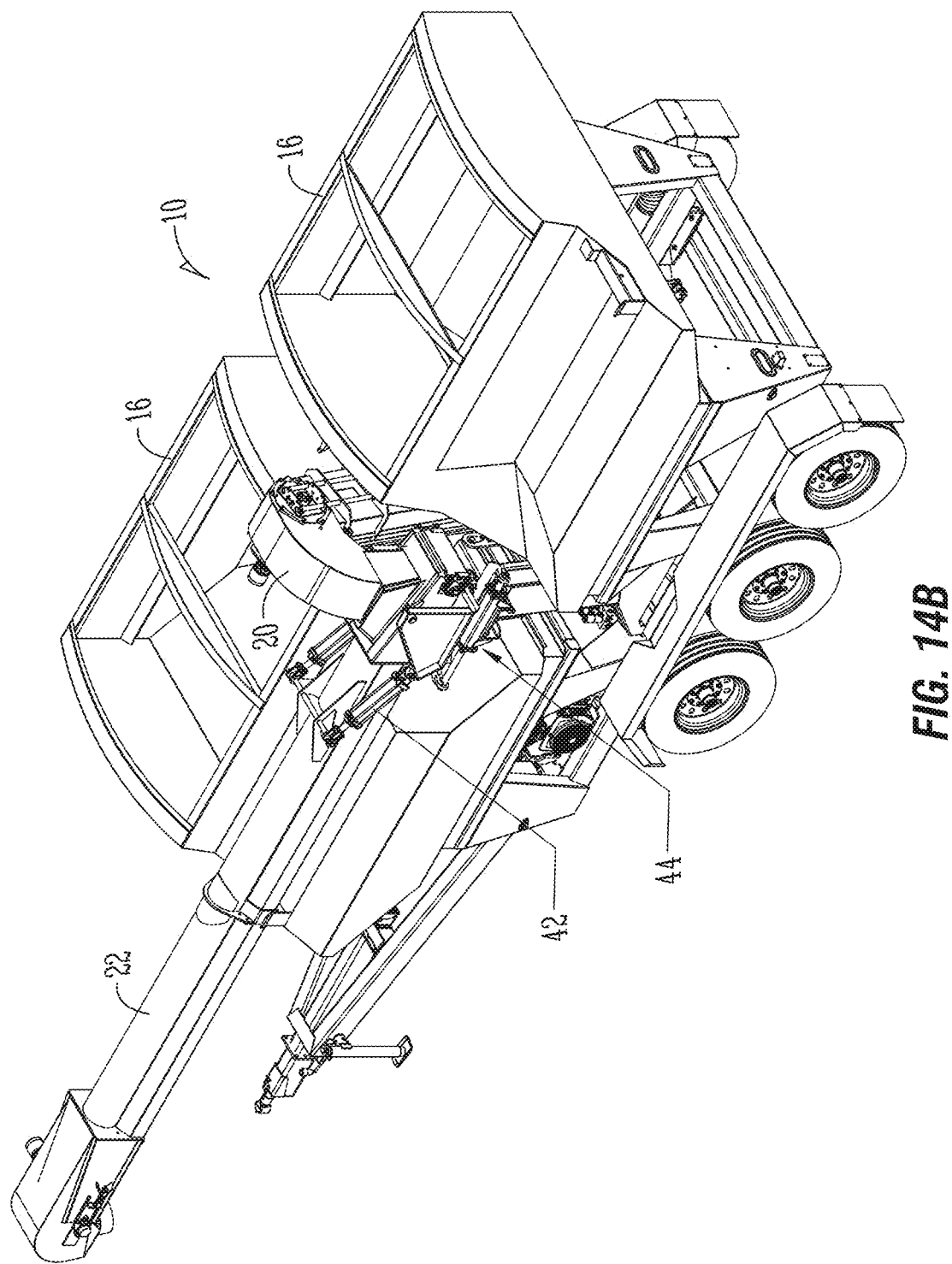
FIG. 14B is a rear perspective view of the cart with the conveyor assembly in a transport position.
Figure 14C:
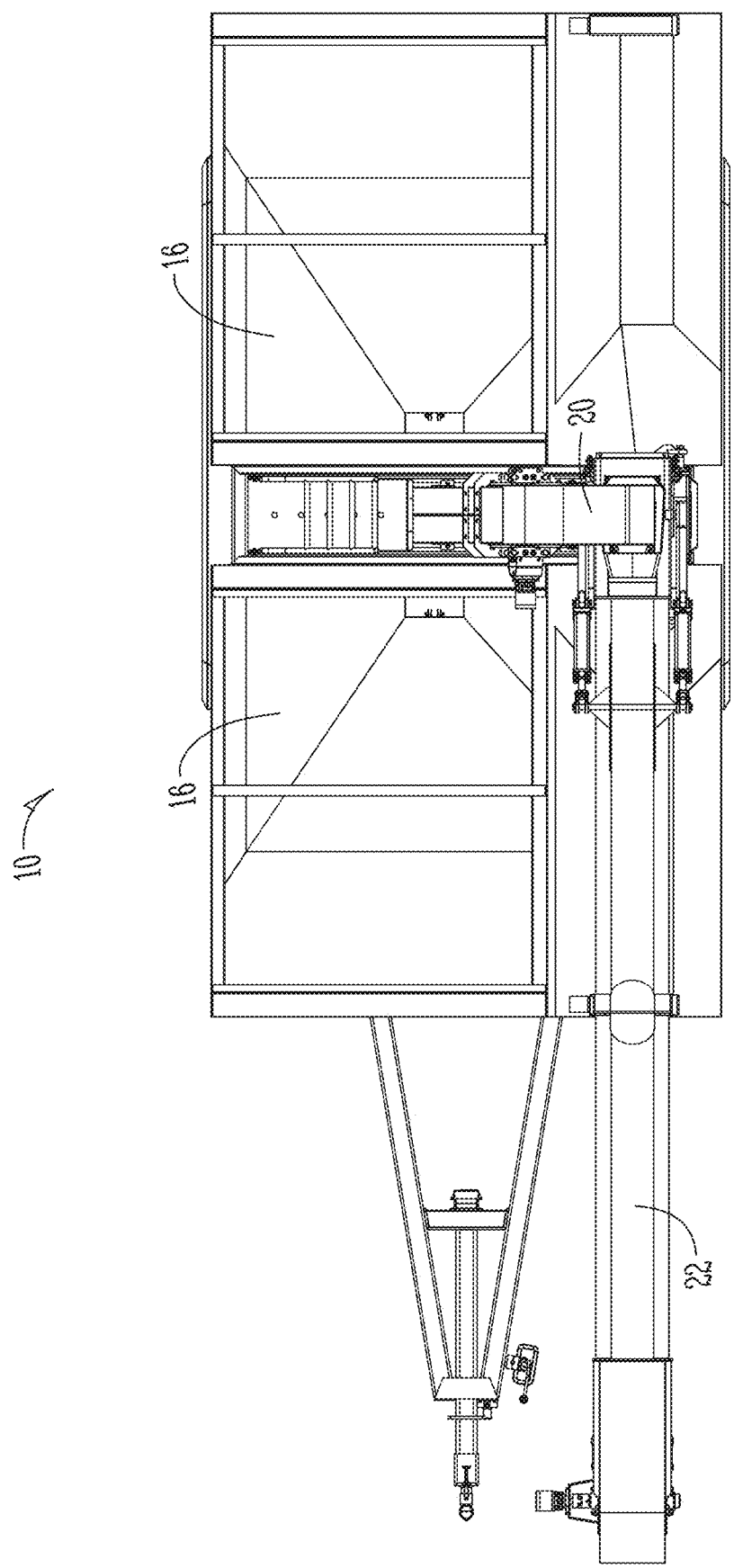
FIG. 14C is a top plan view of the cart shown in FIG. 14A.
Figure 14D:
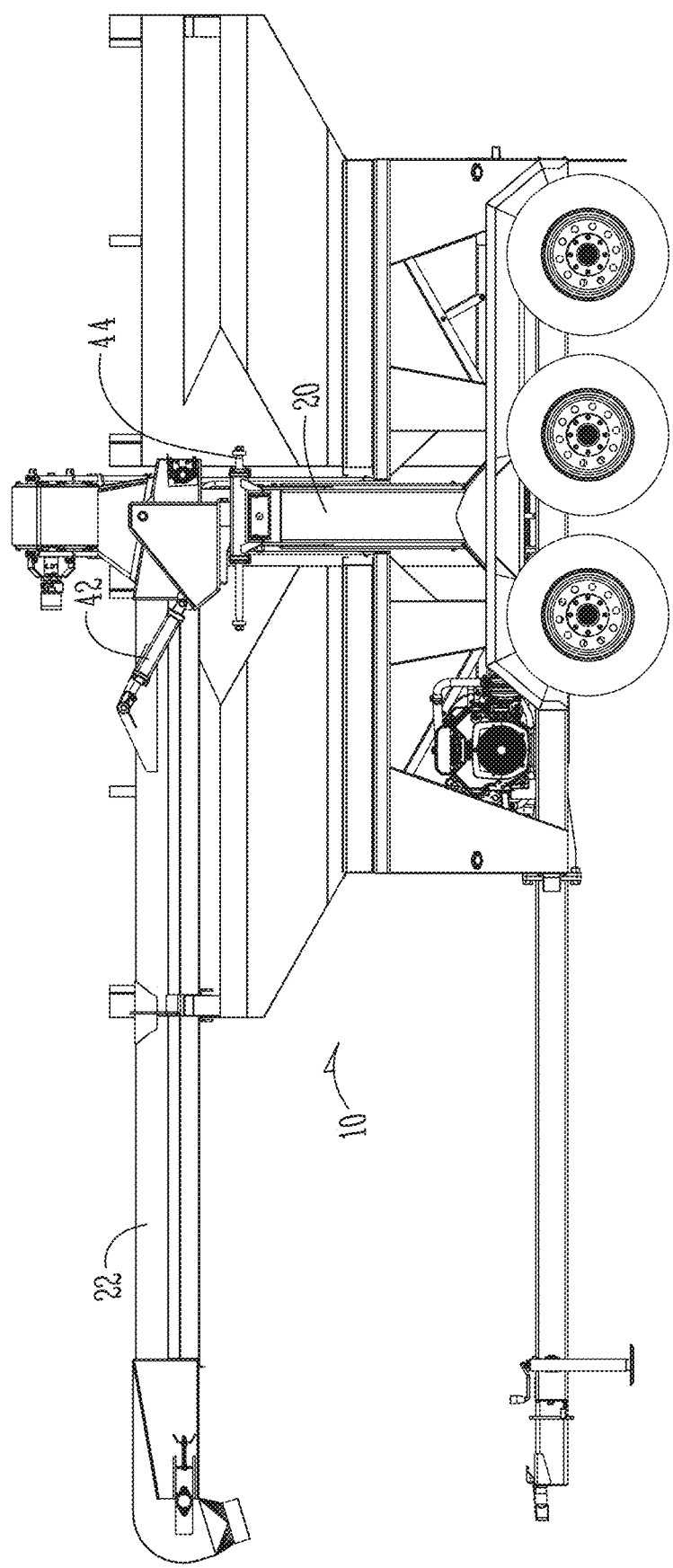
FIG. 14D is a left side elevation of the cart shown in FIG. 14A.
Figure 14E:
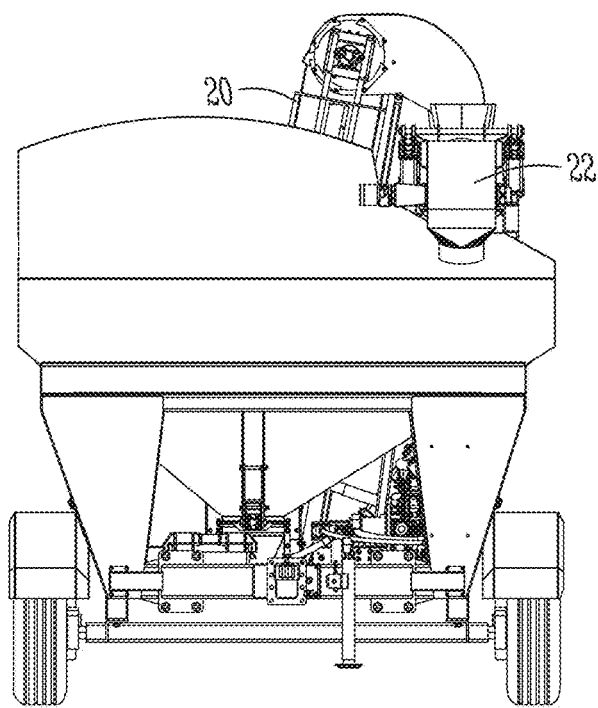
FIG. 14E is a front elevation view of the cart shown in FIG. 14A.
Figure 14F:
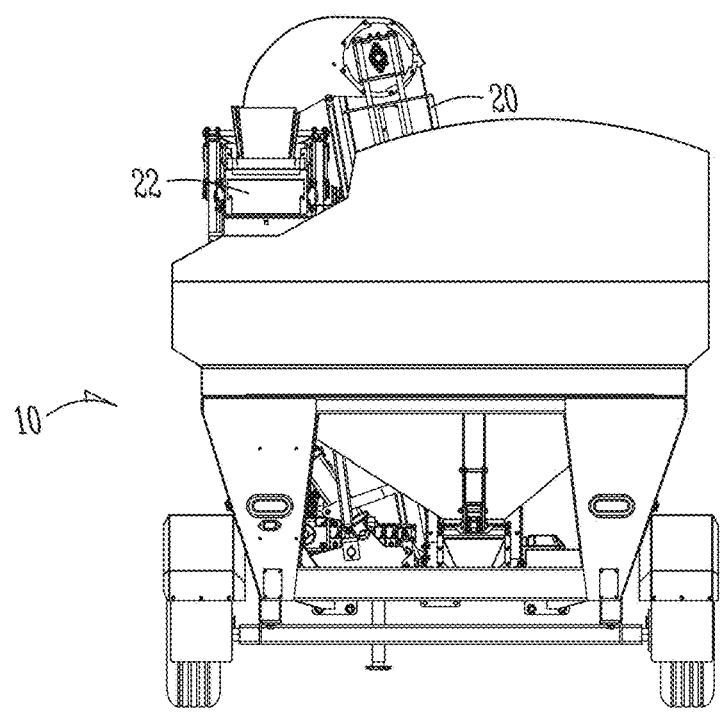
FIG. 14F is a rear elevation view of the cart shown in FIG. 14A.

As best seen in FIGS. 9A, 9B, and 13, the outer conveyer 22 has a base 92. A rack and pinion assembly 94 is operatively mounted beneath the base 92 to facilitate rotation of the conveyor 22 about the vertical axis 38 upon actuation of the cylinder 44.

The outer end 30 of the outer conveyer 22 is similar to the upper end 26 of the inner conveyor 20, with regard to the drive system for the internal belt (not shown). For example, the discharge chute 32 is adjustable via opposite pivot plates (not shown). The internal belt of the conveyor 22 is driven by a roller (not shown) with the shaft driven by a motor 96 mounted on a support plate 98, with bearings and a shaft coupler (not shown).

As seen in FIGS. 5A and 5B, the inlet end 28 of the conveyor 22 resides at a relatively high or elevated position, as compared to a conventional bulk seed cart using a single conveyor extending upwardly from beneath the seed hoppers. This elevated position of the inner end 28 of the other conveyor 22 provides additional clearance so that the conveyor 22 does not interfere with large rear platforms with safety railings that are often provided on conventional planters, particularly when the conveyor 22 is positioned in the rear discharge orientation of FIG. 6D.

Figure 1B:
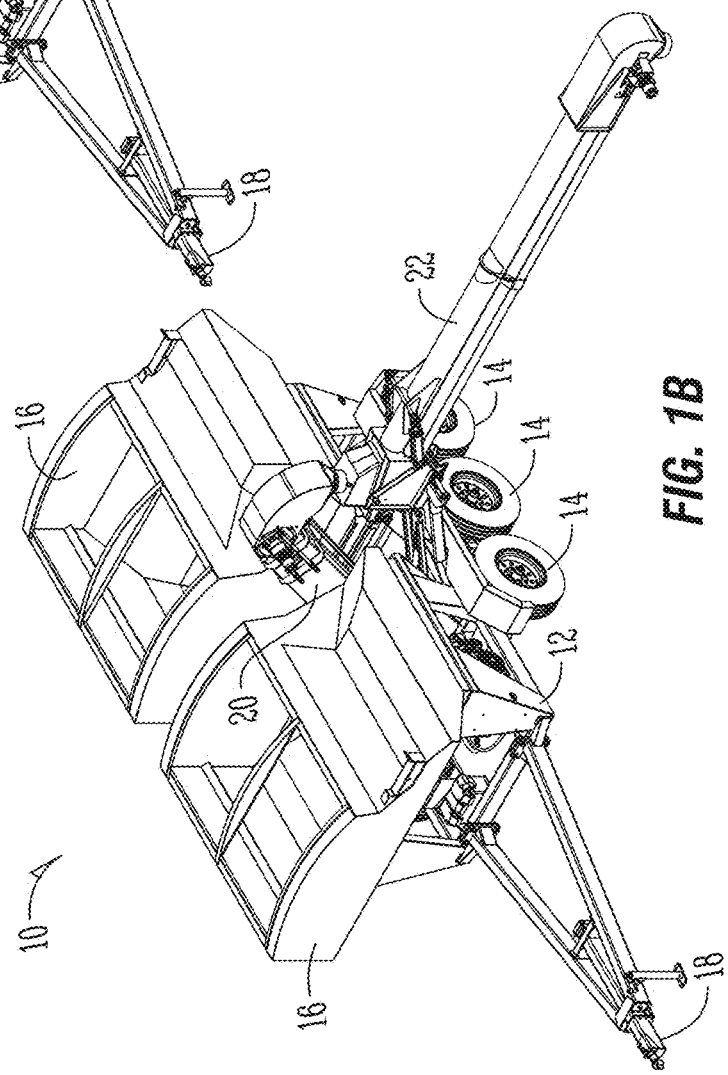
FIG. 1B is a perspective view similar to FIG. 1, with the conveyer assembly in a laterally extended field position.
Figure 3B:
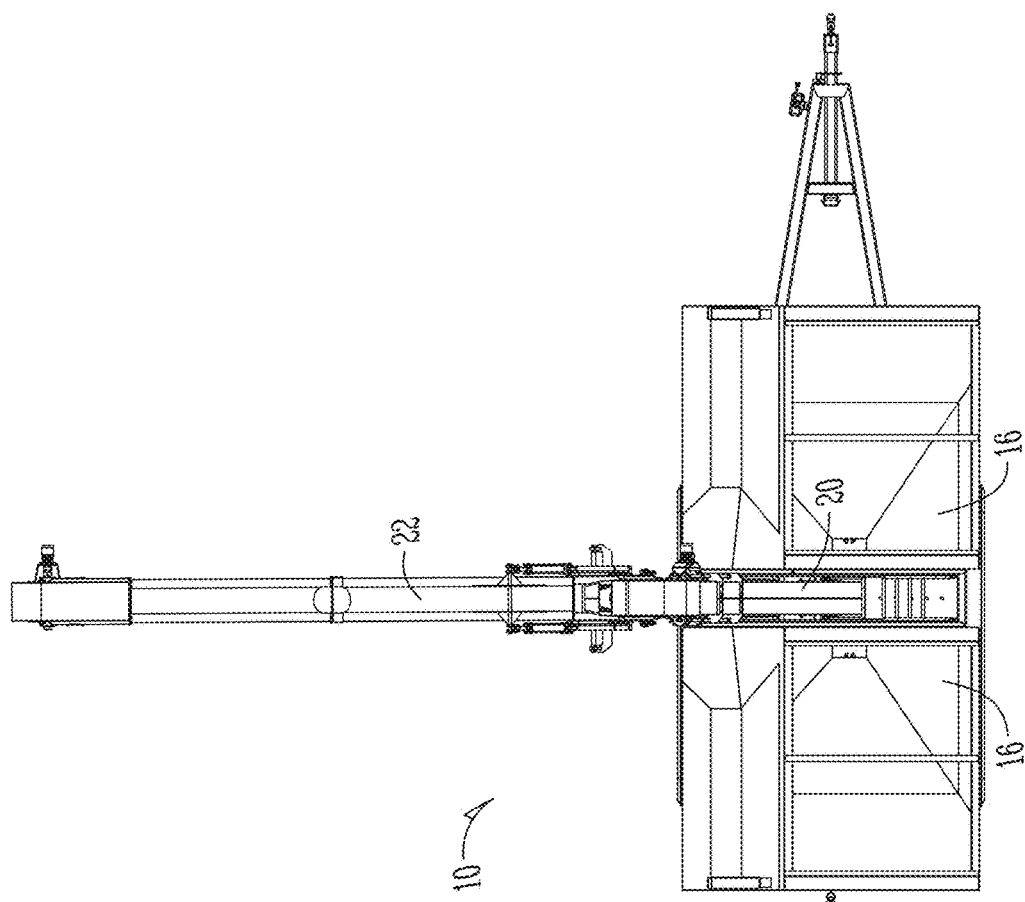
FIG. 3B is a top plan view of the bulk seed cart shown in FIG. 1B.
Figure 3A:
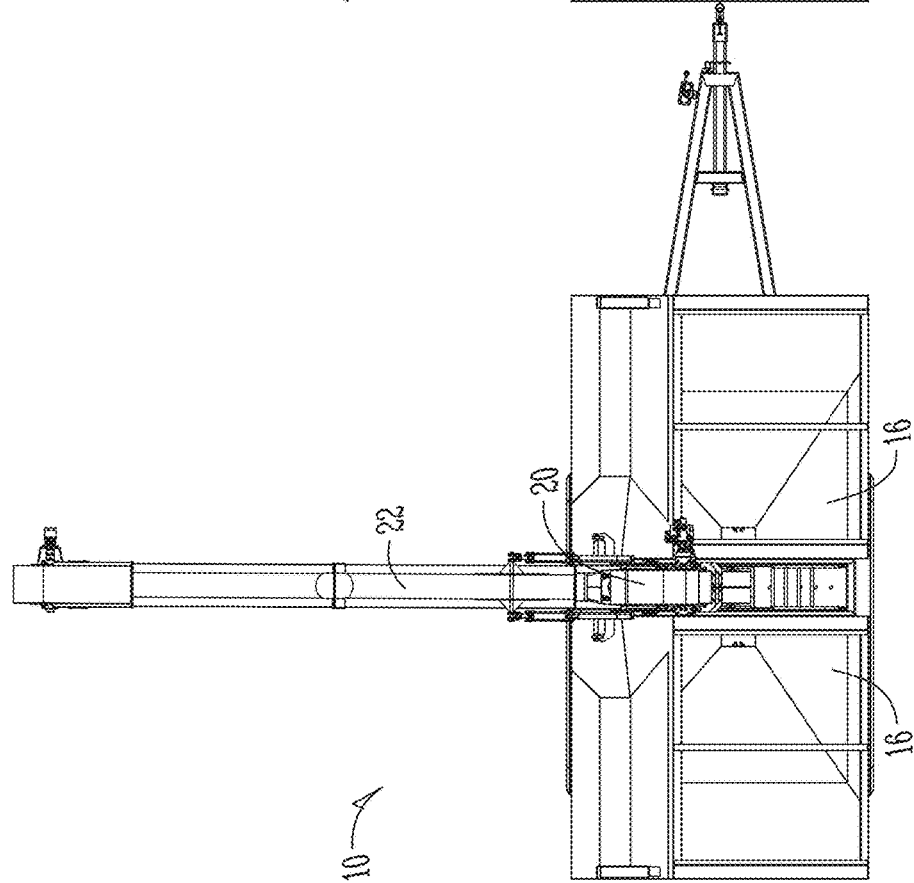
FIG. 3A is a top plan view of the bulk seed cart shown in FIG. 1A.
Figure 4B:
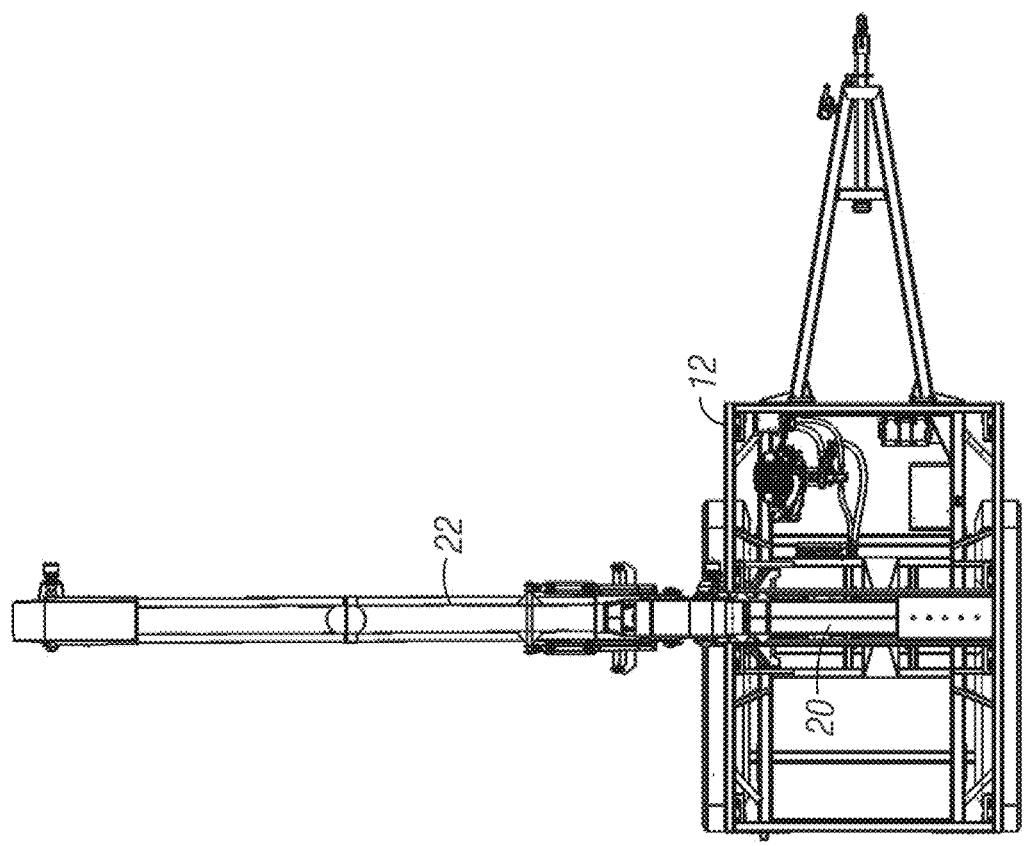
FIG. 4B is a top plan view similar FIG. 3B, with the hopper removed to show the lower end of the first conveyer.
Figure 4A:
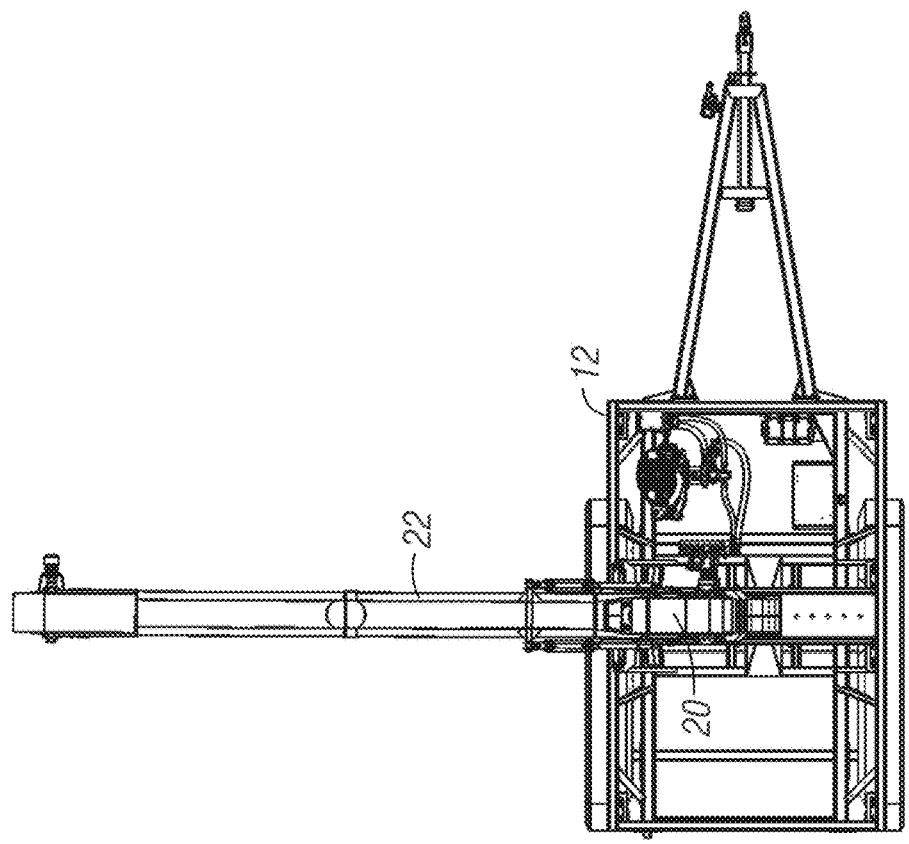
FIG. 4A is a view similar to FIG. 3A, with the hopper removed to show the lower end of the first conveyer.

In use, the conveyor assembly 20, 22 can be moved between the transport position (FIGS. 14A-F) and various field positions. For example, the outer conveyer can extend perpendicular to the longitudinal axis of the cart 10, as seen in FIGS. 1A and 1B, or may extend rearwardly from the cart, as seen in FIG. 6D, and may be laterally disposed forwardly or rearwardly, as shown in FIGS. 6B and 6C. The lateral position of the conveyors 20, 22 may also be adjusted from a retracted position (FIGS. 1A, 2A, 3A, 4A, 5A, and 6A), to an extended position (FIGS. 1B, 2B, 3B, 4B, 5B, and 6B). The height or elevation of the discharge chute 32 can also be adjusted, such as from a horizontal position (FIGS. 5A and 5B) to a raised position (FIG. 7).

The position of the conveyors 20, 22 can be quickly and easily controlled by an operator in the cab of the tractor or seed cart tow vehicle so as to accurately position and align the discharge chute 32 over the upper fill opening on a planter seed tank, without having to move the bulk seed cart 10 or the planter. With the three-axis and hydraulic system of the present invention, the conveyor 22 can be adjusted left and right, up and down, and in and out, to facilitate positioning of the discharge chute 32 over the seed tank fill opening. Thus, the operator or operators only needs to get relatively close to the planter with the bulk seed cart 10. The conveyor 22 can then be rotated about the first, second and third axes 34, 36, 38 to precisely align the discharge chute 32 over the planter seed tank opening. Since no flexible spout or hose is needed to align the discharge chute with the seed tank opening, seeds fall a shorter distance, thereby reducing the risk of seed damage. By eliminating repositioning of the seed cart 10 and/or the planter, valuable time is saved, allowing a quicker return to planting after the seed tanks are filled from the bulk seed cart 10.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. A bulk seed cart, comprising:
    a seed storage hopper with a lower outlet;
    a conveyor system adapted to receive seed from the outlet and carry the seed upwardly to a discharge chute for dispensement into a seed planter tank;
    the conveyor system being pivotal about a vertical axis between a first field position and a second transport position;
    the conveyor system being pivotal about a first horizontal axis to raise and lower the discharge chute in the first field position;
    the conveyor system being pivotal about a second horizontal axis to adjust the discharge chute laterally inwardly and outwardly in the first field position; and
    the conveyor assembly including first and second powered conveyors, and the first powered conveyor being pivotal about the first horizontal axis to adjust the lateral position of the discharge chute, and the second powered conveyor being pivotal about the second horizontal axis to adjust the height of the discharge chute.

2. The bulk seed cart of claim 1 wherein the first powered conveyor is upwardly inclined and the powered second conveyor is positioned end to end with the first powered conveyor.

3. The bulk seed cart of claim 2 wherein the first conveyor has an inlet adjacent the hopper outlet and an outlet, and the second conveyor has an inlet adjacent the first conveyor outlet and an upper end terminating in the discharge chute.

4. The bulk seed cart of claim 2 wherein the first horizontal axis extends longitudinally.

5. The bulk seed cart of claim 2 wherein the first and second conveyors are linked together.

6. The bulk seed cart of claim 1 wherein the first and second horizontal axes extend longitudinally.

7. The bulk seed cart of claim 1 wherein the conveyor system is pivotal by hydraulic cylinders.

8. The bulk seed cart of claim 1 further comprising a first extendible and retractable cylinder to pivot the conveyor system about the first horizontal axis, a second extensible and retractable cylinder to pivot the conveyor system about the second horizontal axis, and a third extensible and retractable cylinder to pivot the conveyor system about the vertical axis.

9. The bulk seed cart of claim 1 wherein the first horizontal axis is adjacent a lower end of the conveyor system.

10. A method of filling a planter seed tank, comprising:
    moving a bulk seed cart and the planter seed tank to positions adjacent to one another; then without changing the positions of the bulk seed cart or the planter seed tank, adjusting a conveyor assembly mounted on a bulk seed cart in lateral, longitudinal, and vertical directions so as to independently position a discharge chute of the conveyor assembly in vertical, lateral, and longitudinal directions, over an opening on top of the planter seed tank;
    the conveyor assembly including first and second powered conveyors, and the method further comprising pivoting the first conveyor about a first horizontal axis to adjust the lateral position of the discharge chute, and pivoting the second conveyor about a second horizontal axis to adjust the height of the discharge chute; and
    actuating the conveyor assembly to carry seed from the bulk seed cart to the discharge chute for discharge into the planter seek tank.

11. The method of claim 10 further comprising pivoting the conveyor assembly from a transport position extending longitudinally along the bulk seed cart to a field position extending outwardly from the bulk seed cart.

12. The method of claim 11 wherein the conveyor assembly pivots about a vertical axis between the transport and field positions.

13. The method of claim 10 wherein the discharge chute is positioned laterally without further moving of the bulk seed cart and the planter seed tank.

14. A bulk seed cart, comprising;
    a seed hopper with a lower outlet;
    a first powered conveyor extending upwardly from the seed hopper outlet, the first conveyor having a first inlet under the hopper outlet and a first outlet;
    a second powered conveyor extending from the first conveyor and having a second inlet positioned under the first outlet and a discharge chute;
    first and second horizontal pivot axes and a vertical pivot axis to move the discharge chute to a desired position; and
    the first powered conveyor being pivotal about the first horizontal axis to adjust the lateral position of the discharge chute, and the second powered conveyor being pivotal about the second horizontal axis to adjust the height of the discharge chute.

15. The bulk seed cart of claim 14 wherein the discharge chute is movable vertically, longitudinally, and laterally relative to one side of the seed hopper.

\* \* \* \* \*